United States Patent
Kelly et al.

(10) Patent No.: US 7,465,321 B2
(45) Date of Patent: *Dec. 16, 2008

(54) PRODUCTION OF BIOPOLYMER FILM, FIBRE, FOAM AND ADHESIVE MATERIALS FROM SOLUBLE S-SULFONATED KERATIN DERIVATIVES

(75) Inventors: Robert James Kelly, Christchurch (NZ); Alisa Dawn Roddick-Lanzilotta, Canterbury (NZ); Douglas Alexander Rankin, Christchurch (NZ); Warren Glenn Bryson, Christchurch (NZ)

(73) Assignee: Keratec Limited (NZ)

( * ) Notice: Subject to any disclaimer, the term of this patent is extended or adjusted under 35 U.S.C. 154(b) by 556 days.

This patent is subject to a terminal disclaimer.

(21) Appl. No.: 10/488,188

(22) PCT Filed: Aug. 30, 2002

(86) PCT No.: PCT/NZ02/00169

§ 371 (c)(1),
(2), (4) Date: Mar. 1, 2004

(87) PCT Pub. No.: WO03/018673

PCT Pub. Date: Mar. 6, 2003

(65) Prior Publication Data

US 2005/0053743 A1   Mar. 10, 2005

(30) Foreign Application Priority Data

Aug. 31, 2001   (NZ) ...................... 511492

(51) Int. Cl.
*D06M 13/256* (2006.01)
*A61K 38/17* (2006.01)
*C07K 14/435* (2006.01)
*B32B 9/02* (2006.01)

(52) U.S. Cl. .................... 8/160; 8/128.3; 530/357; 428/343; 428/355 R; 424/77

(58) Field of Classification Search .................. 8/160, 8/128.3; 530/357; 428/343, 355 R; 424/77
See application file for complete search history.

(56) References Cited

U.S. PATENT DOCUMENTS

| 2,591,945 | A |   | 4/1952  | Koerner et al. |
| 3,567,363 | A |   | 3/1971  | Wolfram |
| 3,619,116 | A |   | 11/1971 | Saville |
| 3,644,084 | A |   | 2/1972  | Hsiung et al. |
| 3,883,647 | A |   | 5/1975  | Geller |
| 4,135,942 | A |   | 1/1979  | Kikkawa |
| 4,407,793 | A |   | 10/1983 | Akimova et al. |
| 4,775,620 | A |   | 10/1988 | Cardiff et al. |
| 4,895,722 | A |   | 1/1990  | Abe et al. |
| 4,904,602 | A | * | 2/1990  | Pigiet et al. ............ 435/191 |
| 4,948,876 | A |   | 8/1990  | Bore et al. |
| 4,969,880 | A |   | 11/1990 | Zamierowski |
| 5,071,441 | A |   | 12/1991 | Schnetzinger et al. |
| 5,154,916 | A | * | 10/1992 | Arraudeau et al. ............ 424/63 |
| 5,358,935 | A |   | 10/1994 | Smith et al. |
| 5,460,967 | A |   | 10/1995 | Fink |
| 5,602,094 | A |   | 2/1997  | Goddard |
| 5,763,583 | A |   | 6/1998  | Arai et al. |
| 5,830,481 | A |   | 11/1998 | Cauwet-Martin et al. |
| 5,932,552 | A |   | 8/1999  | Blanchard et al. |
| 5,972,385 | A |   | 10/1999 | Liu et al. |
| 6,039,962 | A |   | 3/2000  | Cauwet-Martin et al. |
| 6,110,487 | A |   | 8/2000  | Timmons et al. |
| 6,124,265 | A |   | 9/2000  | Timmons et al. |
| 6,159,495 | A |   | 12/2000 | Timmons et al. |
| 6,203,574 | B1 |  | 3/2001  | Kawamura |
| 6,312,674 | B1 |  | 11/2001 | Maubru et al. |
| 6,432,435 | B1 |  | 8/2002  | Timmons et al. |
| 6,514,744 | B2 |  | 2/2003  | Murata et al. |
| 6,544,548 | B1 |  | 4/2003  | Siller-Jackson et al. |
| 6,783,546 | B2 |  | 8/2004  | Zucherman et al. |
| 6,846,940 | B2 |  | 1/2005  | Gaetani et al. |
| 7,169,896 | B2 |  | 1/2007  | Schrooyen et al. |

(Continued)

FOREIGN PATENT DOCUMENTS

CN   1403643   3/2003

(Continued)

OTHER PUBLICATIONS

J. Gorman, "Materials Take Wing: What To Do with 4 Billion Pounds of Feathers?" in Science News, 2002, 161, p. 121.

(Continued)

*Primary Examiner*—Jon P Weber
*Assistant Examiner*—Rosanne Kosson
(74) *Attorney, Agent, or Firm*—Holland & Hart, LLP

(57) ABSTRACT

Film, fibre, foam and adhesive materials are produced from soluble S-sulfonated keratins. Once formed, the films, fibres, foams or adhesives are treated to modify the properties of the materials, in particular to improve the wet strength of the materials. Treatments used include removal of the S-sulfonate group by treatment with a reducing agent, treatment with an acid or treatment with a common protein crosslinking agent or treatment with a reduced form of keratin or keratin protein. The films are made by solvent casting a solution of S-sulfonated keratin proteins, the foam made by freeze-drying a solution of S-sulfonated keratin proteins and the fibres made by extruding a solution of a S-sulfonated keratin protein.

9 Claims, No Drawings

U.S. PATENT DOCUMENTS

| | | | |
|---|---|---|---|
| 2001/0018614 | A1 | 8/2001 | Bianchi |
| 2002/0004068 | A1 | 1/2002 | DiDrusco |
| 2002/0013408 | A1 | 1/2002 | Rhee |
| 2002/0035046 | A1 | 3/2002 | Lukenbach et al. |
| 2002/0183858 | A1 | 12/2002 | Contiliano et al. |
| 2003/0035820 | A1 | 2/2003 | Timmons et al. |
| 2003/0039676 | A1 | 2/2003 | Boyce et al. |
| 2006/0165635 | A1 | 7/2006 | Kelly et al. |
| 2006/0205652 | A1 | 9/2006 | Zamora et al. |

FOREIGN PATENT DOCUMENTS

| | | |
|---|---|---|
| CN | 1425813 | 6/2003 |
| EP | 0 628 573 A1 | 12/1994 |
| EP | 1 201 736 B1 | 4/2005 |
| FR | 1503640 | 12/1967 |
| FR | 2687577 A1 | 8/1993 |
| GB | 2 115 427 | 9/1983 |
| JP | 53-119900 | 10/1978 |
| JP | 63-301809 | 12/1988 |
| JP | 03-007596 | 1/1991 |
| JP | 03-294297 | 12/1991 |
| JP | 05-222100 | 8/1993 |
| JP | 05-320358 | 12/1993 |
| JP | 06-100600 | 4/1994 |
| JP | 06-220713 | 8/1994 |
| WO | WO 1992/002238 | 2/1992 |
| WO | WO 1998/51265 | 11/1998 |
| WO | WO 1999/018922 | 4/1999 |
| WO | WO 1999/19005 | 4/1999 |
| WO | WO 1999/26570 | 6/1999 |
| WO | WO 2000/023039 | 4/2000 |
| WO | WO 2000/41739 | 7/2000 |
| WO | WO 2000/070049 | 11/2000 |
| WO | WO 2002/09659 | 2/2002 |

OTHER PUBLICATIONS

M. Thomas et al., "In Vitro Reconstitution of Wool Intermediate Filaments" in Int. J. Biol. Macromol., 1986, 8, 258-264.

Patent Abstracts of Japan, JP 06-192433 A, Ogawa Tsugio et al., Jul. 12, 1994.

Encyclopedia of Polymer Science and Technology, Interscience Publishers (1968), vol. 8, pp. 7-8.

Hunter, Emma A.L., et al., "Cysteine and Methionin Supplementation Modulate the Effect of Tumor Necrosis Factor a on Protein Synthesis, Glutathione and Zinc Concentration of Liver and Lung in Rats Fed a Low Protein Diet", American Institute of Nutrition, vol. 124, No. 12, pp. 2319-2328, 1994.

Homandberg, G.A., et al., "Fibronectin Fragment Mediated Cartilage Chondrolysis. I. Suppression by Anti-Oxidants", Biochemica et Biophysica Acta, vol. 1317, pp. 134-142, 1996.

Parcell, Stephen, "Sulphur in Human Nutrition and Applications in Medicine", Alternative Medicine Review, vol. 7, No. 1, pp. 22-44, 2002.

Zafarullah, M., et al., "Molecular Mechanisms of N-Acetylcysteine Actions", Cellular and Molecular Life Sciences, vol. 60, No. 1, pp. 6-20, 2003.

Hummel, Klaus M., et al., "Cysteine Proteinase Cathepsin K mRNA Is Expressed in Synovium of Patients with Rheumatoid Arthritis and Is Detected at Sites of Synovial Bone Destruction", Journal of Rheumatology, vol. 25, No. 10, pp. 1887-1984, 1998.

Bradley, Helen, et al., "Sulfate Metabolism is Abnormal in Patients with Rheumatoid Arthritis", Journal of Rheumatology, vol. 21, No. 7, pp. 1192-1196, 1994.

Wilkinson, L.J., et al., "Cysteine Diosygenase: Modulation of Expression in Human Cell Lines by Cytokines and Control of Sulphate Production", Toxicology in Vitro, vol. 16, pp. 481-483, 2002.

Tappaz, M.L., "Taurine Biosynthetic Enzymes and Taurine Transporter: Molecular Identification and Regulations", Neurochemical Research, vol. 29, No. 1, pp. 83-96, Jan. 2004.

Kontny, E., et al., "Impaired Generation of Taurine Chloramine by Synovial Fluid Neutrophils of Rheumatoid Arthritis Patients", Amino Acids, vol. 24, No. 4, pp. 415-418, 2002.

Roughley, Peter J. et al., "Cartilage Proteoglycans: Structure and Potential Functions", Microscopy Research and Technique, vol. 28, No. 5, pp. 385-397, 1994.

Rossi, Antonio, et al., "In Vitro Proteoglycan Sulfation Derived from Sulfhydryl Compounds in Sulfate Transporter Chondrodysplasias", Pediatric Pathology and Molecular Medicine, vol. 22, No. 4, pp. 311-321, 2003.

Kusche-Gullberg, Marion, et al., "Sulfotransferases in Glycosaminoglycan Biosynthesis", Current Opinion in Structural Biology, vol. 13, pp. 605-611, 2003.

Rath, Virginia L., "Sulfotransferase Structural Biology and Inhibitor Discovery", Drug Discovery Today, vol. 9, No. 23, pp. 1003-1011, Dec. 2004.

Venkatachalam, K.V., "Human 3'-phosphoadenosine 5'-phosphosulfate (PAPS) Synthase: Biochemistry, Molecular Biology and Genetic Deficiency", IUBMB Life, vol. 55, pp. 1-11, 2003.

Heyland, Daren K. et al., "Antioxidant Nutrients: A Systematic Review of Trace Elements and Vitamins in the Critically III Patient", Intensive Care Med., vol. 31, pp. 327-337, 2005.

Elsayed, Nabil M., "Antioxidant Mobilization in Response to Oxidative Stress: A Dynamic Environmental-Nutritional Interaction", Nutrition, vol. 17, pp. 828-834, 2001.

Serhan, Charles N., et al., "Resolution of Inflammation: The Beginning Programs the End", Nature Immunology, vol. 6, No. 12, pp. 1191-1197, Dec. 2005.

Henson, Peter M., "Dampening Inflammation", Nature Immunology, vol. 12, No. 12, pp. 1179-1182, Dec. 2005.

Verbruggen, G., "Chondroprotective Drugs in Degenerative Joint Diseases", Journal of Rheumatology, vol. 45, pp. 129-138, 2006.

Largo, R., et al., "Glucosomine Inhibits IL-1b-Induced NFkB Activation in Human Osteoarthritic Chondrocytes", OsteoArthritis and Cartilage, vol. 11, pp. 290-298, 2003.

Chan, P.S., et al., "Clucosamine and Chondroitin Sulfate Regulate Gene Expression and Synthesis of Nitric Oxide and Prostaglandin E2 in Articular Cartilage Explants", OsteArthritis and Cartilage, vol. 13, pp. 387-394, 2005.

Rassin, D.K., et al., "Nutritional Approaches to Improve Cognitive Development During Infancy: Antioxidant Compounds", Acta Paediatr Suppl., vol. 442, pp. 34-41, 2003.

Brugge, Karen L., et al., "The Role of Alterations in Free Radical Metabolism in Mediating Cognitive Impairments in Down's Syndrome", EXS, vol. 62, pp. 190-198, 1992.

Del Marmol, Veronique, et al., "Cysteine Deprivation Promotes Eumelanogenesis in Human Melanoma Cells", Journal of Investigative Dermatology, vol. 107, No. 5, pp. 698-702, 1996.

Smit, Nico P.M., et al., "Melanogenesis in Cultured Melanocytes Can Be Substantially Influenced by L-Tyrosine and L-Cysteine", Journal of Investigative Dermatology, vol. 109, No. 6, pp. 796-800, 1997.

Fujiwara, Y., et al., "Effect of Simultaneous Administration of Vitamin C, L-Cysteine and Vitamin E on the Melanogenesis", Biofactors, vol. 21, No. 104, pp. 415-418, 2004.

Kong, Kwang-Hoon, et al., "Expression and Characterization of Human Tyrosinase From a Bacterial Expression System", Comparative Biochemistry and Physiology, Part B, vol. 125, pp. 563-569, 2000.

Yamamura, Tatsuo, et al., "Antimelanogenic Activity of Hydrocoumarins in Cultured Normal Human Melanocytes by Stimulating Intracellular Glutathione Synthesis", Archives of Dermatological Research, vol. 294, No. 8, pp. 349-354m 2002.

Alonso, Laura C., et al., "Molecular Genetic and Endocrine Mechanisms of Hair Growth", Hormone Research, vol. 60, pp. 1-13, 2003.

Olney, J.W., et al., Brian Damage in Infant Mice Following Oral Intake of Glutamate, Aspartate or Cysteine, Nature, vol. 227, pp. 609-610, 1970.

Riise, G.C., "The Intrabronchial Microbial Flora in Chronic Bronchitis Patients: A Target for N-Acetylcysteine Therapy", European Respiratory Journal, vol. 7, pp. 94-101, 1994.

Grandjean, E.M., et al., "Efficacy of Oral Long-Term N-Acetylcysteine in Chronic Bronchopulmonary Disease: A Meta- Analysis of Published Double-Bline, Placebo-Controlled Clinical Trials", Clinical Therapy, vol. 22, pp. 209-221, 2000.

Hansen, N.C.G., et al., Orally Administered N-Acetylcysteine May Improve General Well-Being in Patients with Mild Chronic Bronchitis, Respitory Medicine, vol. 88, pp. 531-535, 1994.

Rasmussen, J.B., et al., Reduction in Days of Illness After Long-Term Treatment with N-Acetylcysteine Controlled-Release Tablets in Patients with Chronic Bronchitis, European Respitory Journal, vol. 1, pp. 351-355, 1988.

Parr, G.D., et al., Oral Fabrol (oral N-acetylcysteine) in Chronic Bronchitis, British Jornal of Diseases of Chest, vol. 81, pp. 341-348, 1987.

Ardissino, D., et al., "Effect of Transdermal Nitroglycerin or N-acetylcysteine, or Both, in the Long-Term Treatment of Unstable Angina Pectoris", Journal of the American College of Cardiology, vol. 29, pp. 941-947, 1997.

Estensen, R.D., et al., "N-acetylcysteine Suppression of the Proliferative Index in the Colon of Patients with Previous Adenomatous Colonic Polyps", Cancer Letters vol. 147, pp. 109-114, 1999.

Kinscherf, R., et al., Effect of glutathione Depletion and Oral N-acetylcysteine Treatment on CD4+ and CD8+ Cells. FASEB Journal, vol. 8, pp. 448-451, 1994.

Akerlund, et al., "Effect of N-acetylcystine (NAC) Treatment on HIV-1 Infection: A Double-Blind Placebo-Controlled Trial", European Journal of Clinical Pharmacology, vol. 50, pp. 457-461, 1996.

Zhang, Shumin, et al., "A Prospective Study of Plasma Total Cysteine and Risk of Breast Cancer", Epidemiology Biomarkers & Prevention, vol. 12, pp. 1188-1193, 2003.

James, L.P., et al., "Effect of N-Acetylcysteine on Acetaminophen Toxicity in Mice: Relationship to Reactive Nitrogen and Cytokine Formation", Toxicological Sciences, vol. 75, No. 2, pp. 458-467, 2003.

Shanikar, K., et al., "Type 1 Diabetic Mice are Protected fro mAcetaminophen Hepatotoxicity", Toxicology Sciences, vol. 72, No. 2, pp. 220-234, 2003.

Goodman, M.T., Case-Control Study of Plasma Folate, Homocysteine, Vitamin B12, and Cysteine as Markers of Cervical Dysplasia, Cancer, vol. 89, No. 2, pp. 376-382, 2000.

Bernard, G.L. et al., "A Trial of Antioxidants N-Acetylcysteine and Procysteine in ARDS. The Antioxidant in ARDS Study Group", Chest, vol. 112, pp. 164-172, 1997.

Tepel, M., et al., "Prevention of Radiographic-Contrast-Agent-Induced Reductions in Renal Function by Acetylcysteine", New England Journal of Medicine, vol. 343, pp. 180-184, 2000.

Walters, M.T., et al., "A Double-Blind, Cross-Over, Study of Oral N-Acetylcysteine in Sjogren's Syndrome", Scand J. Rheumatol Suppl., vol. 61, pp. 253-258, 1986.

De Vries, N., et al., "N-acetyl-l-cysteine", Journal of Cellular Biochemistry Supplement, vol. 17F, pp. 270-277, 1993.

Beloqui, O., et al., "N-aceytl Cysteine Enhances the Response to Interferon-Alpha in Chronic Hepatitis C: A Pilot Study", Journal of Interferon Research, vol. 13, pp. 279-282, 1993.

Feghali, J.G., et al., "L-n-acetyl-cysteine Protection Against Cisplatin-Induced Auditory Neuronal and Hair Cell Toxicity", Laryngoscope, vol. 111, No. 7, pp. 1147-1155, 2001.

Balli, R., "Controlled Trial on the Use of Oral Acetylcysteine in the Treatment of Glue-Ear Following Drainage", European Journal of Respitory Diseases, vol. 61, Suppl. 111, p. 159, 1980.

Yalcin, E. et al., "N-acetylcysteine in Chronic Blepharitis", Cornea, vol. 21, pp. 164-168, 2002.

Connors, S.L., et al., "Secretin and Autism: The Role of Cysteine", Journal of the American Academy of Child and Adolescent Psychiarty, vol. 38, pp. 795-796, 1999.

Apple, S.K., et al., "Effect of Feather Meal on Live Animal Performance and Carcass Quality and Composition of Growing Finishign Swing", Journal of Animal Science, vol. 81, pp. 172-181, 2003.

Loy, T.W., et al., "Effects of Supplementation on Intake and Growth of Nursing Calves Grazing Native Range in Southeastern North Dakota", Journal of Animal Science, vol. 80, pp. 2717-2725, 2002.

Pohl, Thomas, "Concentration of Proteins and Removal of Solutes", Methods in Enzymology, vol. 182, pp. 68-83, 1990.

McNeil, Steven, "Heavy Metal Removal Using Wool Filters", Asian Textile Journal, pp. 88-90, May-Jun. 2001.

Fukatsu, K., "Degradation of Fe(III) - Wool Keratin Complex by Hydrogen Peroxide", Kumanoto Women's University, Kumamoto, Japan, Sen'i Gakkaishi (Fiber), vol. 46, No. 5. pp. 186-191.

Thomas, Helga, et al., "In Vitro Reconstitution of Wool Intermediate Filaments" Int. J. Biol. Macromol., vol. 8, pp. 258-264, Oct., 1986.

Harrap, B.S., et al., "Soluble Derivatives of Feather Keratin", Biochem J., vol. 92, No. 8, pp. 8-18, 1964.

Swan, J.M., "The Reaction of Protein Thiol and Disulphide Groups with Cupric Sulphite Solutions", pp. 69-83, Sep. 1960.

Mies, Von H.H., et al., "Praparative Gewinnung loslicher Proteine Aus Wolle", Das Leder, pp. 1-9, Jan. 1988.

Thomas, Helga, et al., "Experiments for the Isolation of Matrix Proteins of Wool in Disulphide Form", Melliand Textilberichte, pp. 297-300, Apr. 1983.

Goto M, Suyama K., "Occlusion of Transition Metal Ions by New Adsorbents Synthesized from Plant Polyphenois and Animal Fibrous Proteins", www.pubmed.gov, Dec. 18, 2006. Abstract only.

Miles, H.H., et al., "Chromatographic and Electrophoretic Investigation of the Properties of Unprotected Low-Sulpher Wool Kerateins", Journal of Chromatography, vol. 405, pp. 356-370, 1987.

Pavlath, Attila E., et al., "Clarity of Films from Wool Keratin", Textile Res. J., vol. 69, No. 7, pp. 539-541, 1999.

Platt, A.J., et al., "A Comparative Study of Silicone Net Dressing and Paraffin Gauze Dressing in Skin-Grafted Sites", Burns, vol. 22, No. 7, pp. 543-545, 1996.

Valenta, Claudia, et al., "The Use of Polymers for Dermal and Transdermal Delivery", European Journal of Pharmaceutics and Biopharmaceutics, vol. 58, pp. 279-289, 2004.

Jonkman, Marcel F., et al., "New Method to Assess the Water Vapour Permeance of Wound Coverings", Biomaterials, vol. 9, pp. 263-267, May 1988.

Ming Yang, Jen, et al., "Properties of Chitosan Containing PP-g-AA-g-NIPAAm Bigraft Nonwoven Fabric for Wound Dressing", Journal of Membrane Science, vol. 243, pp. 1-7, 2004.

Freedman, Gordon, et al., "Practical Treatment of Pain in Patients with Chronic Wounds: Pathogenesis-Guided Management", The American Journal of Surgery, vol. 188, pp. 31S-35S, 2004.

Coderch, L., et al., "Chromatographic Characterization of Internal Polar Lipids from Wool", JAOCS, vol. 72, No. 6, pp. 715-720, 1995.

Coderch, L., et al., "Physicochemical Characteristics of Liposomes Formed with Internal Wool Lipids", JAOCS, vol. 73, No. 12, pp. 1713-1718, 1996.

Wertz, Philip W., et al., "The Composition of the Ceremides from Human Stratum Corneum and from Comedones", The Journal of Investigation Dermatology, vol. 84, No. 5, pp. 410-412, 1985.

Matsumoto, Kiyoichi, et al., "Studies on Regenerated Protein Fibers, III. Production of Regenerated Silk Fibroin Fiber by the Self-Dialyzing Wet Spinning Method", Journal of Applied Polymer Science, vol. 60, pp. 503-511, 1996.

Yang, Yiqi, et al., "Formaldehyde-Free Zein Fiber-Preparation and Investigation", Journal of Applied Polymer Science, vol. 59, pp. 433-441, 1996.

Cates, David M., et al., "Preparation and Properties of Fibers Containing Mixed Polymers III. Polyacrylonitrile-Silk Fibers", Journal of Polymer Science, vol. 21, No. 97, pp. 125-138, 1956.

Schimpf, Warren C., "Fibers from Regenerated Collagen", Ind. Eng. Chem., Prod. Res. Dev., vol. 16, No. 1, pp. 90-92, 1977.

Sastry, T.P., et al., "Graft Copolymerization of Feather Keratin Hydrolyzate: Preparation and Characterization", Journal of Polymer Materials, vol. 14, No. 2, pp. 177-181, 1997.

Tanabe, Toshizumi, et al., "Preparation and Characterization of Keratin-Chitosan Composition Film", Biomaterials, vol. 23, pp. 817-825, 2002.

Kazunori, Katoh, et al., "Preparation and Properties of Keratin-Poly(vinyl alcohol) Blend Fiber", Journal of Applied Polymer Science, vol. 91, pp. 756-762, 2004.

Yamauchi, Kiyoshi, et al., "Cultivation of Fibroblast Cells on Keratin-Coated Substrata", J. Biomater Sci. Polymer Edn., vol. 9, No. 3, pp. 259-270, 1998.

Gillespie, J. Morton, "The Structural Proteins of Hair: Isolation, Characterization, and Regulation of Biosynthesis", Biochemistry and Physiology of the Skin, pp. 475-510, 1983.

Marshall, R.C., et al., "Structure and Biochemistry of Mammalian Hard Keratin", Electron Microsc. Rev., vol. 4, pp. 47-83, 1991.

Gillespie, J.M., et al., "Variability in the Proteins of Wool and Hair", Division of Protein Chemistry, CSIRO, vol. 2, pp. 67-77, 1980.

Milgram, Norton W., et al., "Landmark Discrimination Learning in the Dog: Effects of Age, an Antioxidant Fortified Food, and Cognitive Strategy", Neuroscience and Biobehavioral Reviews, vol. 26, pp. 679-695, 2002.

* cited by examiner

US 7,465,321 B2

PRODUCTION OF BIOPOLYMER FILM, FIBRE, FOAM AND ADHESIVE MATERIALS FROM SOLUBLE S-SULFONATED KERATIN DERIVATIVES

This application is the U.S. national phase of International Application No. PCT/NZ02/00169, filed on Aug. 30, 2002, which claims priority to New Zealand Application No. 511492, filed on Aug. 31, 2001.

FIELD OF THE INVENTION

This invention relates to the preparation and use of soluble keratin derivatives in the production of a range of biopolymer materials such as films, fibres, foams and adhesives, and the improvement of those materials using further chemical treatments.

BACKGROUND TO THE INVENTION

Keratins are a class of structural proteins widely represented in biological structures, especially in epithelial tissues of higher vertebrates. Keratins may be divided into two major classes, the soft keratins (occurring in skin and a few other tissues) and hard keratins, forming the material of nails, claws, hair, horn and (in birds and reptiles) feathers and scales.

The hard keratins may in turn be further subdivided into structural types described as $\alpha$-keratin, $\beta$-keratin, or feather keratin. Keratins of the $\alpha$ and $\beta$ types have different predominant structural motifs in their proteins, in the former case supramolecular structures based on the $\alpha$-helix secondary structure of protein chains, and in the latter case on the $\beta$-pleated sheet motif.

All keratins are characterised by a high level of the sulphur-containing diamino-acid cystine, which acts as a cross-linking point between protein chains. This feature of a high-level of interchain crosslinking through cystine gives the keratins, especially the hard keratins, their characteristics of toughness, durability, resistance to degradation, and desirable mechanical properties. Cystine contents vary widely in the keratins, which is reflected in their variation in mechanical properties.

Wool and hair are examples of hard $\alpha$-keratin. However, even in a given $\alpha$-keratin, there are many classes of structural protein present, and the mechanical properties arise from a sophisticated supramolecular organisation of proteins of many different types to create a complex morphology with a correspondingly complex mechanical behaviour.

An object of the invention is to provide biopolymer materials derived from soluble keratin derivatives and production methods for producing the biopolymer materials.

SUMMARY OF THE INVENTION

According to a broadest aspect of the invention there are provided materials derived from S-sulfonated keratin proteins, as herein defined, in the form of films, fibres, foams or adhesives. The S-sulfonated keratin proteins can be derived from wool keratin and be enriched in intermediate filament protein(s).

According to another aspect of the invention there is provided a process method for the formation of films from S-sulfonated keratin proteins in which a solution of the proteins is cast and the solution solvents evaporated to leave a protein film.

The solution(s) used can be aqueous based, including some proportion of organic solvents.

The films produced by this process method are inherently soluble in water or the solvent mix used for casting the film.

Another aspect of the invention describes a method for improving the wet strength of films, produced by the process method, by using chemical agents, such as thiols and phosphines, that remove the sulfonate group and allow the formation of disulfide bonds within the protein film. The difsulfide bonds provide the film with wet strength.

Another method of improving the wet strength of a film, produced by the process method, is described in which acidic solutions are used to treat the protein film, and through a process of protonation of the sulfonate groups and any other suitable polar groups within the protein, the film becomes insoluble in water and has significant wet strength.

Another aspect of the invention describes introduction of crosslinks into a film, produced by the process method, through the use of crosslinking agents such as those commonly used in protein modifications, that target a range of functional groups present within the protein.

A further aspect of the invention is a method for the production of protein films using a solution comprising a combination S-sulfonated keratin proteins and reduced keratin proteins or peptides containing reactive cysteine residues. The two species combine to form a crosslinked keratin network and subsequently a protein film with good wet strength properties. This approach of combining S-sulfonated and reduced keratins can also be applied to the production of keratin fibres, foams and adhesives.

A further aspect of the invention is a method for the production of keratin fibres through the extrusion of a solution comprising of S-sulfonated keratin proteins through a spinnerette into a coagulation bath that causes the protein to become insoluble. In particular the coagulation bath may contain reductants, such as thiols or phosphines, that cause the removal of the sulfonate group from the protein and lead to disulfide groups forming. In addition the coagulation bath can contain crosslinking agents, such as formaldehyde or glutaraldehyde, which cause the protein(s) to become insoluble on contact with the coagulation bath. In addition the coagulation bath can be at acidic pH, which also causes the protein solution to become insoluble.

A further aspect of the invention is a method for the production of keratin fibres through the extrusion of a solution comprising of S-sulfonated keratin proteins through a spinnerette into a hot environment through which the solvent is rapidly removed and a fibrous keratin material remains. Fibres produced in this way can be further processed through wet chemical treatments to improve the wet strength of the fibres through the formation of crosslinks, or by protonation of the protein in manners similar to those described above for keratin films.

A further aspect of the invention is a method for the production of keratin foams through the freeze drying of a solution of S-sulfonated keratin proteins. Foams produced in this way can be modified using similar methods to those described for keratin films, that is through the use of a reductant such as a thiol or phosphine to remove the S-sulfonate group, through the use of reduced keratin proteins or peptides to remove the S-sulfonate group, through the use of an acidic solution to protonate the S-sulfonate group and the protein, or through the use of crosslinking agents such as formaldehyde and glutaraldehyde to modify the protein.

A further aspect of the invention is a range of keratin based adhesives, comprising at least in part a solution of S-sulfonated keratin proteins. These adhesives can be made to have superior wet strength properties through the use of reducing agents, such as thiols or phosphines. Alternatively wet strength can be imparted through the use of a reduced keratin protein or reduced keratin peptide, to create a crosslinked keratin network. These two sets of reagents can form a 'two pot' adhesive.

The flexibility of the films, fibres, foams and adhesives produced by the methods described can be modified through the use of plasticizers such as those from the glycerol or polyethylene glycol families.

According to further aspect of the invention there is provided a film, fibre, foam or adhesive material derived from keratin derivates of high molecular weight as described and claimed in PCT/NZ02/00125 whereby the process includes a first stage digestion step of sulfonating a keratin source by oxidative sulfitolysis followed by a second stage repetitive aqueous extraction involving separation of soluble and insoluble keratin and subsequent re-extraction of the insoluble keratin to thereby produce a highly S-sulfonated keratin derivative. The protein keratin source can be a naturally occurring protein source.

According to yet a further aspect of the invention there is provided a film, fibre, foam or adhesive material derived from either highly S-sulfonated keratin intermediate filament proteins, soluble keratin peptides or a purified protein with little or no damage to the structural integrity of the protein as produced from an impure protein source as described above.

According to yet a further aspect of the invention there is provided a combination of engineering solutions to produce a film, fibre, foam or adhesive material derived from S-sulfonated keratin proteins.

According to yet another aspect of the invention there is provided a film, fibre, foam or adhesive material obtained from a protein produced from a large scale recovery method as described and claimed in PCT/NZ02/00125.

DESCRIPTION OF PREFERRED EXAMPLES

The features of this invention specifically cite some methods and applications based on hard α-keratins from wool. However, the principle can equally well apply to alternative α-keratins, or any source of keratin which is able to yield proteins of the intermediate filament (IF) type.

Similar preparative methods have been applied by the applicants to other keratin sources such as feathers, to produce materials equally well suited for some of the applications described below. The features of this invention are intended to cover the utilisation of such keratins as well, in applications which are not dependent on the presence of proteins of the α-type (IF proteins). This includes applications where preparations based on β or feather keratin may be combined with IF proteins.

The characteristics of toughness and insolubility typical of hard keratins are desirable properties in many industrial materials. In addition, keratin materials are biodegradable and produced from a sustainable resource and as such they have significant potential for use as a substitute for oil-based polymers in many applications, such as films, fibres and adhesives. Their use in cosmetics and personal care applications is already well established and an extension to medical materials is proposed using materials such as those outlined in this specification.

Wool represents a convenient source of hard α-keratins, although any other animal fibre, or horns, or hooves, would serve equally well as a source of the desired proteins. Wool is composed of approximately 95% keratin, which can be broadly divided into three protein classes. The intermediate filament proteins are typically of high molecular weight (45-60 kD), with a partly fibrillar tertiary structure and a cysteine content of the order of 6%. They account for approximately 58% of the wool fibre by mass although only part of this mass is actually helix-forming in structure. The high- and ultra-high-sulphur proteins, approximately 26% of the wool fibre, are globular in structure, have a molecular weight range of 10-40 kD and can contain cysteine levels up to 30 mol %. The high-glycine-tyrosine proteins are a minor class comprising 6% of the wool fibre, have molecular weights of the order of 10 kD and are characterised by their high content of glycine and tyrosine amino acid residues.

Proteins from the different classes of wool keratins possess characteristics that will give them unique advantages in specific applications.

This invention pertains largely to the use of intermediate filament proteins, and the use of them to produce films, fibres, foams and adhesives.

Nonetheless the other non-fibrillar proteins have applications in their own right in more restricted fields.

Likewise feather keratins, derived by extractive procedures similar to those applied to wool, have specific valuable applications in certain areas as defined below, but do not contain the IF proteins deemed to be desirable in some end-uses.

The soluble keratin derivatives used in the method and subsequent chemical treatments described in this specification were obtained from wool or feathers either by reduction using sodium sulphide or by oxidative sulphitolysis. An example of process for the production of soluble keratin derivates is described in the applicant's PCT/NZ02/00125 patent specification, the description of which is incorporated herein by way of reference and outlined above. The reduction of wool or feather keratin using sodium sulphide involves dissolution in a dilute sodium sulphide solution (or other sulphide solution). The combination of high solution pH and sulphide ion concentration results in the keratin being degraded to some extent, with possible hydrolysis of some of the peptide bonds occuring, as well as the disulphide bonds being reduced to yield protein rich in thiol and polysulphide functionality. The rich thiol function of the isolated protein can be confirmed using reagents such as nitroprusside. Oxidative sulfitolysis involves the conversion of the cysteine in keratin to S-sulfocysteine by the action of sodium sulphite and an oxidant. No peptide hydrolysis occurs and the solubilised keratin has a molecular weight distribution very similar to that in the unkeratinised state. Proteins derivatised in this way are referred to herein as S-sulfonated keratin proteins throughout the process methods, and are isolated from an oxidative sulfitolysis solution in the acid form, that is as kerateine S-sulfonic acid.

S-sulfonated keratin protein is soluble only as the salt, which can be prepared by the addition of base to the S-sulfonated keratin protein. For the preparation of films from S-sulfonated wool keratin Intermediate filament protein it is convenient to prepare a 5% protein solution by suspending S-sulfonated keratin protein in water and adding base such as sodium hydroxide or ammonia to give a final composition of 1 ml 1M NaOH, or equivalent base, per gram of protein to a give a solution with a final pH In the range 9-10. Casting this solution onto a flat surface, such as a glass plate, and allowing the water and/or ammonia to evaporate at room temperature results in the formation of a keratin film. These keratin films have a high degree of clarity and have the physical properties detailed in Table 1 below. In untreated films there is likely to be little or no covalent bonding occurring between keratin proteins within the material as the disulphide bonds present in the original keratin have been converted to S-sulfocysteine.

The hydrogen bonding and other non-covalent interactions occurring between the proteins are clearly significant, as the tensile strength of the material in the dry state is relatively high. The hydrogen bonding type interactions are overcome in the presence of water, reflected by the large decrease in tensile strength under wet conditions.

The physical properties of the materials derived from S-sulfonated keratin proteins depend to a large extent on the nature of the interactions between the proteins comprising the material. These can be affected significantly by a range of chemical treatments, with one of the most significant of these treatments being the use of a reductant to remove the sulfonate group from the protein to leave a thiol function. Under atmospheric conditions, or in the presence of an oxidant such as dilute hydrogen peroxide, these thiol functions recombine to form disulfide bonds and return the chemical nature of the keratin material to one much closer to the original form, that is proteins containing a high proportion of cystine disulfide links.

Treatment with a reducing agent, such as ammonium thioglycollate at pH 7 for 30 minutes, or tributylphosphine for 24 hours, is an effective way to remove the sulfonate function from S-sulfonated keratin. This can be confirmed using infrared studies as the S-sulfonate group gives rise to a strong, sharp absorbance at 1022 $cm^{-1}$ which is observed to disappear on exposure of the S-sulfonated to the reagents described.

In one aspect of the invention the reductant used to remove the sulfonate function and introduce cystine disulfides is itself a keratin protein. Reduced keratin proteins, or keratin peptides, containing the thiol function can be readily produced by the process of sulphide dissolution described above. Keratin proteins prepared in this way contain the cysteine reducing group which may covalently attach directly to the S-sulfonate group to form a cystine disulfide. In this way a crosslinked keratin network is formed without the use of other agents.

In the case of S-sulfonated wool keratin intermediate filament protein films reductive treatment significantly improves the wet strength properties of the material, as indicated by Table 1. The material retains a good degree of flexibility when wet. Other chemical treatments also affect the film properties. Treatment with an acid, such as 1M hydrochloric acid, protonates the basic groups within the protein and converts the S-sulfocysteine, present as the sodium or ammonium salt, to S-sulfonic acid. This can improve the hydrogen bonding interactions, as the wet strength of the film clearly improves and no covalent bonds have been introduced. The S-sulfonate functionality, as determined by infra-red absorption, remains intact. Standard protein crosslinking treatments, such as the use of formaldehyde or glutaraldehyde, also improve the wet strength of the film, and introduce rigidity in both the wet and dry states. This is achieved through crosslinking the proteins in a way that does not specifically target the sulfonate functionality and many of the amino acid residues containing nucleophilic side groups such as lysine, tyrosine and cystine may be involved in crosslinking.

TABLE 1

Strength, extension and swelling data for protein films.

| Film and treatment | Dry strength ×$10^{-7}$N$m^{-2}$ (cv) | Wet strength ×$10^{-7}$N$m^{-2}$ (cv) | % extension at break dry (cv) | % extension at break wet (cv) |
|---|---|---|---|---|
| Untreated | 1.3 (11) | 0.06 (15) | 151 (24) | 227 (20) |
| Reductant | 5.9 (7) | 2.2 (21) | 6 (16) | 208 (15) |
| Acid | 6.1 (3) | 1.6 (14) | 6 (31) | 387 (6) |
| Glutaraldehyde | 5.0 (8) | 1.9 (14) | 4 (11) | 4 (8) |
| Formaldehyde | 2.8 (16) | 0.96 (8) | 7 (41) | 13 (25) | cv = coefficient of variation, %, n = 5

Solutions of S-sulfonated keratin proteins can be used to produce reconstituted keratin fibres by a variety of extrusion methods. Using a wet spinning approach, similar in concept to the spinning of viscose rayon in which a solution of a material is extruded into a coagulation bath in which the material is insoluble, solutions of S-sulfonated keratin proteins can be extruded into solutions containing chemicals that make the protein become insoluble. Any of the three approaches described for chemically treating S-sulfonated keratin films can be employed in the coagulation bath used to generate keratin fibres. By employing reductants, such as ammonium thioglycollate, in the coagulation bath, the S-sulfonated keratin proteins are converted back to keratins containing cystine disulfides through a wet spinning process, thereby producing reconstituted keratin fibres that have a multitude of disulfide links and good physical properties. By using acidic conditions the S-sulfonated keratin proteins become protonated and subsequently insoluble. By using crosslinking agents, such as formaldehyde or glutaraldehyde, the protein also becomes insoluble. The coagulation baths can also contain high concentrations of salt or solvent to assist the process of fibre formation. In each case precipitation of the extruded protein occurs, possibly only in an outer skin of the extruded filament, and a fibre is formed with sufficient mechanical integrity to allow it to be collected from the coagulation bath and subjected to further treatments such as drawing or other chemical processes.

A dry spinning approach can also be employed for the production of reconstituted keratin fibres. The method is similar in concept to the formation of S-sulfonated keratin films described above, in which solvent is removed from an S-sulfonated keratin protein solution and a keratin material remains. In the formation of fibres this approach is employed by extruding a solution of S-sulfonated keratin protein that has a composition typically of 6-10% protein and up to 50% of a solvent such as acetone, ethanol or isopropylalcohol, with the remaining portion of the solution being water and a base such as sodium hydroxide to give a pH of 9-10. This solution is extruded downwards into a chamber containing a continuous downward hot air stream which causes the solvent to rapidly evaporate, and an S-sulfonated keratin fibre remains. Subsequent chemical treatments, such as the reductive, acidic or crosslinking treatments described for keratin films described above, can be employed to impart wet strength properties to keratin fibres produced by this method.

Solutions of S-sulfonated keratins can be used to prepare highly porous protein foams. This is achieved by freeze drying a solution, prepared as described for the casting of keratin films. In order to produce foams the solution is cast onto an appropriate dish or surface and frozen, prior to being freeze dried. The resulting porous network is a foam of S-sulfonated keratin protein. As with the film and fibre forms of this material, applying chemical modifications to the protein has a significant effect on the wet properties of the material. In particular, applying reductants such as ammonium thioglycollate or tributylphosphine under similar conditions to those applied to the protein film, results in the removal of the S-sulfonate group and the formation of a network of disulfide bonds, and subsequently decreases the solubility and increases in the wet strength of the foam. A reduced form of keratin can also be used to similar effect, again resulting in the formation of foam comprising of a keratin protein interconnected through a network of disulfide bonds. Treatment of the foam with an acid, such as 1M hydrochloric acid, results in protonation of any available groups within the material, such as the S-sulfonate group, and a subsequent increase in the wet strength of the material. Crosslinking agents, such as formaldehyde or glutaraldehyde, can also be used to significantly modify the wet properties of the foam.

All the above applications relate preferentially to the case of IF-type proteins prepared from hard α-keratins such as wool, but other applications such as the following one can use keratins from other sources, such as feather keratin.

Solutions of keratins obtained from wool or feathers by either reduction using sodium sulphide or by oxidative sulphitolysis as described above show significant adhesive properties in various applications. However, the wet strength of both of these adhesives is limited. Keratin made soluble by sulphide reduction is degraded to some extent and contains protein chains of lower molecular weight than in the original wool. S-sulfonate derived keratin polymers contain no covalent crosslinks and hydrogen bonding interactions are weakened significantly in water, as demonstrated by the keratin films described above. However the wet strength and adhesive properties can be greatly enhanced by reforming disulphide cross-links, by adding an oxidant in the case of sulphide-derived proteins, or a reducing agent in the case of the S-sulfonated keratin proteins. By such means very effective adhesive bonding can be achieved, for example in wood-particle composites bonded with oxidised sulphide-derived proteins.

A particular feature of this invention relates to the recognition that the sulphide-derived protein and the S-sulfonated keratin proteins can be used in conjunction to create highly cross-linked structures with very superior properties. As noted above, the former class of protein can be crosslinked by oxidation, and the latter by reduction. The two protein classes, one being in a reduced state and the other in an oxidised state, will when mixed form a self-crosslinking system. In effect, in such a system, an addition of sulphide-derived protein is acting as a reductant and crosslinking agent to convert the S-sulfonate groups in the other component to disulfide bonds.

Such a two-pot self-crosslinking system is a particular aspect of the invention which will have applications in many forms of product, and has the advantage of eliminating volatile low molecular weight materials and the necessity to use solvents in some forms of product fabrication. Thus it is to be expected that such composites can be formed from mixtures of solids or viscous dispersions without shrinkage.

In such two-component systems, the respective sulphide-derived and S-sulfonate keratin proteins can be produced from the same or different keratin sources. For example, if the mechanical property characteristics associated with IF proteins were desirable, the S-sulfonated keratin protein could be derived from a hard α-keratin such as wool, and the sulphide-derived protein from another keratin source such as feathers.

An alternative two-component system is one which utilises a reductant from the thiol or phosphine family in addition to S-sulfonated keratin proteins. Combining solutions of these two materials results in the removal the sulfonate group and formation of cystine disulfudes in the manner described above for keratin films and fibres. This gives rise to an adhesive formulation with good wet strength properties.

By such means, proteins from sources other than hard keratins can be incorporated into many of the product classes described above, and therefore the features in this invention encompass keratin sources in general and are not restricted to hard α-keratins.

Polar, soluble reagents of low molecular weight, such as polyethylene glycol or glycerol, can be employed as plasticising agents to give keratin materials flexibility. These agents are best employed by inclusion in the keratin solutions used as the starting point for the formation of films, fibres or adhesives.

EXAMPLES

Example 1a

Preparation of a Keratin Film

In order to prepare an S-sulfonated keratin film, a 5% keratin protein solution was prepared by suspending 0.5 g S-sulfonated wool keratin intermediate filament protein in water, followed by the gradual addition of 0.5 ml of 1M sodium hydroxide to the vigorously stirred solution over approximately 2 hours. The pH of the solution was carefully monitored and observed to elevate to ~pH10 upon immediate addition of base, and gradually fall as the base was absorbed by dissolution of the protein. A final pH of 9.5 was obtained. The protein solution was centrifuged at 34,000 g to remove any insoluble material and the resulting solution was cast onto a 100 mm square petri dish and allowed to dry under ambient conditions. Following drying a clear protein film remained which could be easily removed from the petri dish.

Example 1b

Disulfide Crosslinking of Protein Films

In order to improve the wet strength of S-sulfonated keratin films, disulfide crosslinks were introduced to the film by immersing the films produced in Example 1a in a solution containing a reducing agent. One example is a solution comprising 0.25M ammonium thioglycollate and 0.1M potassium phosphate buffer adjusted to pH 7.0. Another example is a solution comprising 1M thioglycollic acid. Another example is a solution containing 85 microlitres of tributyl phosphine in 20 ml of 10% (v/v) 0.2M borate buffer in dimethyl formamide buffered to pH 9.0. Following immersion in the solution with gentle agitation for 30 minutes in the case of the thiols and 24 hours in the case of the phosphine, the keratin film was removed, rinsed briefly with water and allowed to dry under ambient conditions.

Example 1c

Protonation of Protein Films

In order to improve the wet strength of S-sulfonated keratin films, acid was used to protonate all available sites on the proteins. This was achieved through immersion of the film produced in Example 1a in 1M hydrochloric acid for 30 minutes. Following a brief wash with water the film was allowed to dry under ambient conditions.

Example 1d

Non-disulfide Crosslinking of Protein Films

In order to improve the wet strength of S-sulfonated keratin films crosslinking agents were used to chemically bond proteins together. In one case this was achieved through the use of a solution of 8% formaldehyde in 0.1M phosphate buffer at pH 7.0. The film was immersed in this solution for 30 minutes, washed briefly with water and allowed to dry under ambient conditions. In another case, crosslinking was achieved through the use of a solution of 5% glutaraldehyde in 0.1M phosphate buffer at pH7.0. The film was immersed in this solution for 30 minutes, washed briefly with water and allowed to dry under ambient conditions for 30 minutes.

Example 1e

Plasticising of Protein Films

In a variation of Example 1a, flexible protein films are made by incorporating glycerol or polyethylene glycol into the protein solution described in Example 1a at a level up to 0.2 g per g of protein prior to casting the film. The resulting films have a greater flexibility, as determined by extension at break measurements, than the analogous films containing no plasticiser.

Example 2a

Production of Keratin Fibres Through Wet Spinning and Disulfide Crosslinking In order to prepare fibres derived from S-sulfonated keratin proteins a spinning dope was prepared in a similar manner to that prepared in Example 1a, with the difference being that for the extrusion of fibres, the concentration of protein in the solution was in the range 6-15%. A plasticiser, such as those described in Example 1e, was added to the spinning dope. Following centrifuging to remove solids and entrained air the dope was forced, using a positive displacement pump such as a syringe or gear pump, or air pressure, through a spinnerette into a coagulation bath. The coagulation bath had a composition of 1M ammonium thioglycollate, 0.4M sodium phosphate, 0.25M sodium sulfate, 2% glycerol all set to pH 7.0.

Example 2b

Production of Keratin Fibres Through Wet Spinning and Non-Disulfide Crosslinking In a variation to Example 2a, fibres were extruded into a coagulation bath with a composition of 0.25M ammonium thioglycollate, 0.1M sodium phosphate, 8% formaldehyde and 2% glycerol. This served to form tough fibres without forming disulfide bonds, as shown by infra red analysis which clearly indicated the presence of the S-sulfonate group. Subsequent treatment of the fibres with solutions containing reductants, such as ammonium thioglycollate at a concentration of 0.25M and a pH of 7.0 with 0.1M potassium phosphate buffer, was sufficient to remove the S-sulfonate group and reform disulfide bonds.

Example 2c

Production of Keratin Fibres Through Dry Spinning

In order to produce fibres through a dry spinning process, first a spinning dope was prepared in a similar manner to that described in Example 2a. In variation to the dope preparation a solvent such as acetone or isopropylacohol was added to the dope to give a final composition protein in the range 6-15%, solvent in the range 20-50% and plasticiser in the range 1-3%. The dope was extruded through a spinnerette, using similar technology to that described in Example 2a, downwards into a chamber with a continuous downwards hot air stream. This caused the solvent to rapidly evaporate leaving a keratin fibre. Subsequent wet processing of the fibre, through the use of acid, reductant and crosslinking agents, of the type described in Examples 1, was used to improve the wet strength properties of the fibre.

Example 3a

Production of a Keratin Foam

A solution of S-sulfonated keratin protein, prepared to a protein concentration of 5% as described in Example 1a, was used to create a keratin foam by freezing the solution in a 100 mm square petri dish and freeze drying the resulting solid.

Example 3b

Chemical Modification of Keratin Foam

Chemical solutions containing reductants, acids or crosslinking agents, of the described in Examples 1b, c, and d were applied to the keratin foam, in a manner identical to that described for the keratin film. A keratin foam with significantly reduced solubility and improved wet strength resulted.

Example 4a

Application of a Keratin Adhesive to Bind Wood

A solution of S-sulfonated keratin protein, prepared to a protein concentration of 5% as described in Example 1a, was used to bind woodchips by mixing the keratin solution with woodchips in a ratio of 1 ml solution per gram of woodchips. The mixture was then pressed and heated in a similar manner to the production of commercial urea-formaldehyde bound particle board (3 MPa, 180° C., 300 s), and a solid wood keratin composite resulted.

Example 4b

Application of a Keratin Adhesive to Bind Textiles

A solution of S-sulfonated keratin protein, prepared to a protein concentration of 5% as described in Example 1a, was used to bind woollen textiles by coating one of the textile surfaces with the keratin solution and pressing another textile onto the coated textile with the use of a pinch roller system. Following the drying of the composition at elevated temperature a bonded textile was produced. In a small variation, plasticiser was included in the protein solution, in a manner similar to that described in example 1d, to produce a flexible adhesive.

Example 4c

A Two Pot Adhesive System Using a Reductant

An adhesive was made by combining a solution of S-sulfonated keratin protein, prepared in the manner described in Example 1a, with a solution of a reductant. The reductant solution contained 10% triscarboxyethylphosphine hydrochloride. When mixed in a ratio of 10 parts keratin solution to 1 part reductant solution and applied to two wood surfaces this two pot formulation dried over 12 hours to create a strong bond between the wooden surfaces that remained strong in a moist environment. In a variation of this application a reductant solution was used which contained 0.25M ammonium thioglycollate buffered to pH 7.0 with 0.1M potassium phosphate. When mixed in a ratio of 10 parts keratin solution to 1 part reductant solution and applied to two wood surfaces this two pot formulation dried over 12 hours to create a strong bond between the wooden surfaces that remained strong in a moist environment.

Example 4d

A Two Pot Adhesive System Using Two Forms of Keratin

An adhesive was made by combining a solution of S-sulfonated keratin protein, prepared in the manner described in Example 1a, with a reduced keratin peptide solution which contained sulphur amino acids primarily in the form of cysteine and had a compositon of 5% protein and 2% sodium sulphide. When mixed in equal parts and applied to two wood surfaces this two pot formulation dried over 12 hours to create a strong bond between the wooden surfaces that remained strong in a moist environment. In a variation of this application, the reduced keratin peptide was used in the form of a solid and mixed with the S-sulfonated keratin protein solution in a ratio of 5 parts S-sulfonated keratin solution to 1 part reduced keratin solid and applied to two wood surfaces this two pot formulation dried over 12 hours to create a strong bond between the wooden surfaces that remained strong in a moist environment.

Where in the description particular integers are mentioned it is to be appreciated that their equivalents can be substituted therefore as if they were set forth herein.

Thus by the invention there is provided a method for the preparation and use of soluble keratin derivatives in the production of a range of biopolymer materials such as films, fibres, foams and adhesives, and the improvement of those materials using further chemical treatment.

Particular examples of the invention have been described and it is envisaged that improvements and modifications can take place without departing from the scope of the attached claims.

The invention claimed is:

1. A porous solid foam or an adhesive material derived from S-sulfonated proteins.

2. The foam or adhesive material as claimed in claim 1 where the S-sulfonated proteins comprise S-sulfonated wool keratin intermediate filament proteins.

3. The foam or adhesive material as claimed in claim 1 or claim 2 wherein the keratin proteins are reconstituted from a solution.

4. The material as claimed in claim 1 or claim 2 which is a foam.

5. The material as claimed in claim 1 or claim 2 which is an adhesive.

6. The material of claim 5 which is in the form of an aqueous solution.

7. The adhesive as claimed in claim 5 comprising a solution of S-sulfonated keratins.

8. The adhesive as claimed in claim 5, also comprising a reductant selected from the group consisting of phosphine, thiol and mixtures thereof.

9. An adhesive as claimed in claim 5 constituting a two pot adhesive in which one component is solution of S-sulfonated keratin protein and other component is solution of reduced keratins or reduced keratin peptides, that on combination react to form a crosslinked network and subsequently an adhesive.

\* \* \* \* \*